United States Patent
Kress et al.

(10) Patent No.: US 12,240,049 B2
(45) Date of Patent: Mar. 4, 2025

(54) REAMER

(71) Applicant: MAPAL Fabrik für Präzisionswerkzeuge Dr. Kress KG, Aalen (DE)

(72) Inventors: Jochen Kress, Aalen (DE); Matthias Klasche, Bopfingen (DE)

(73) Assignee: MAPAL Fabrik für Präzisionswerkzeuge Dr. Kress KG, Aalen (DE)

( * ) Notice: Subject to any disclaimer, the term of this patent is extended or adjusted under 35 U.S.C. 154(b) by 717 days.

(21) Appl. No.: 17/602,771

(22) PCT Filed: Apr. 8, 2020

(86) PCT No.: PCT/EP2020/060002
§ 371 (c)(1),
(2) Date: Oct. 10, 2021

(87) PCT Pub. No.: WO2020/208067
PCT Pub. Date: Oct. 15, 2020

(65) Prior Publication Data
US 2022/0152714 A1     May 19, 2022

(30) Foreign Application Priority Data

Apr. 11, 2019   (DE) .............. 10 2019 205 260.6

(51) Int. Cl.
B23D 77/02     (2006.01)

(52) U.S. Cl.
CPC ........ B23D 77/02 (2013.01); *B23D 2277/061* (2013.01); *B23D 2277/105* (2013.01); *B23D 2277/205* (2013.01); *B23D 2277/74* (2013.01)

(58) Field of Classification Search
CPC .............. B23D 77/02; B23D 2277/061; B23D 2277/105; B23D 2277/205; B23D 2277/74; B23B 2220/44
See application file for complete search history.

(56) References Cited

U.S. PATENT DOCUMENTS 7,682,111 B2 * 3/2010 Omi ................... B23C 5/1081
                                                    407/53
9,144,853 B2 * 9/2015 Bitzer ................. B23D 77/02
(Continued)

FOREIGN PATENT DOCUMENTS

CN      102205444 A  * 10/2011 ............. B23D 77/02
CN      102950314 A    3/2013
(Continued)

OTHER PUBLICATIONS

English translation of IPRP for PCT Application No. PCT/EP2020/060002 dated Sep. 28, 2021, 9 pages.
(Continued)

*Primary Examiner* — Eric A. Gates
(74) *Attorney, Agent, or Firm* — Sheppard Mullin Richter & Hampton LLP

(57) ABSTRACT

The invention relates to a reamer (3), having a main body (5) and at least one cutting tip (1) arranged on the main body (5), the cutting tip (1) having a reamer section (7), the cutting tip (1) having, at a distance (A) from the reamer section (7), a roughening section (9) having at least one roughening blade (11), the at least one roughening blade (11) protruding beyond the reamer section (7) by a particular projection (D).

12 Claims, 4 Drawing Sheets

(56) References Cited

U.S. PATENT DOCUMENTS

| | | | |
|---|---|---|---|
| 11,491,558 B2 * | 11/2022 | Teusch | B23C 3/34 |
| 2003/0103821 A1 | 6/2003 | Kress et al. | |
| 2003/0156912 A1 * | 8/2003 | Ono | B23D 77/00 |
| | | | 408/229 |
| 2012/0251256 A1 * | 10/2012 | Shea | B23D 77/12 |
| | | | 408/145 |

FOREIGN PATENT DOCUMENTS

| | | | | |
|---|---|---|---|---|
| CN | 203817528 U | | 9/2014 | |
| CN | 104586476 A | | 5/2015 | |
| DE | 10129431 A1 | | 6/2003 | |
| DE | 102005035140 A1 | | 1/2007 | |
| DE | 102008058452 A1 | | 2/2010 | |
| DE | 102009028040 A1 | | 2/2011 | |
| DE | 102014202066 A1 | | 8/2015 | |
| DE | 102016216926 A1 | | 3/2018 | |
| EP | 1561535 A1 * | | 8/2005 | B23C 3/051 |
| EP | 2679324 A2 * | | 1/2014 | B23B 41/12 |
| JP | H052247 Y2 | | 1/1993 | |
| JP | H0634899 Y2 | | 9/1994 | |
| JP | 3188415 B2 * | | 7/2001 | B23D 77/02 |
| JP | 2008264979 A * | | 11/2008 | B23B 51/08 |
| KR | 20110109831 A * | | 10/2011 | B23D 77/02 |
| WO | 2013091778 A1 | | 6/2013 | |

OTHER PUBLICATIONS

International Search Report and Written Opinion for PCT/EP2020/060002 dated Aug. 4, 2020, 14 pages.

* cited by examiner

REAMER

CROSS REFERENCE TO RELATED APPLICATIONS

This application is a U.S. National Stage Application under 35 U.S.C. 371 of International Application No. PCT/EP2020/060002, filed Apr. 8, 2020, which claims priority to German Patent Application No. 10 2019 205 260.6, filed Apr. 11, 2019. The contents of each of the aforementioned are hereby incorporated by reference in their entirety into the present disclosure.

The invention relates to a reamer.

Reamers are typically used to produce bores with a very precisely defined geometry and high surface quality. Multi-bladed reamers have proven to be particularly productive, wherein existing bores, whether they are formed in the casting process or produced by another tool, for example a drill, can be machined very quickly. However, there are also bore surfaces in which a high level of smoothness, such as is typically produced by a reamer, is not desired. In particular in the case of a pin bore on a connecting rod for a reciprocating piston engine, which is also designated as a small eye, the surface should be given a certain surface roughness that is higher than the roughness that is normally achieved with conventional reamers. A plain bearing element which does not have an adequate grip on a surface that is too smooth is typically pressed into such a bore later.

The German laid-open specification DE 10 2005 035 140 A1 discloses a reamer in which, in addition to a reaming cutter which is fixedly arranged on a main body, a graver is also provided which roughens the surface. It has been shown, however, that the service life of such a tool is unsatisfactory, especially if only a single graver is provided. Furthermore, a substantial adjustment effort is necessary in order to precisely adjust the projection of the graver, which is arranged far away from the fixed reaming cutter, relative to the reaming cutter and thus to achieve a defined surface roughness. The known reamer is therefore capable of improvement.

The object of the invention is to create a reamer in which the said disadvantages do not occur.

The object is achieved by the provision of the present technical teaching, in particular the teaching of the independent claims and the embodiments disclosed in the dependent claims and the description.

The object is achieved in particular by creating a reamer which has a main body and at least one cutting tip arranged on the main body. The cutting tip has a reamer section and, at a distance from the reamer section, a roughening section having at least one roughening blade. The at least one roughening blade protrudes beyond the reamer section by a particular projection. In this way, the roughening section and the reamer section can be arranged at a small distance from one another, in particular compared to the prior art, and it is also possible to arrange the roughening section fixedly relative to the main body and in particular relative to the reamer section, so that adjustment effort is minimal or even completely omitted. If a large number of reamer sections are provided, in particular on a large number of cutting tips, a large number of roughening sections can be provided at the same time in a particularly simple manner, so that the wear on the individual roughening sections is advantageously reduced. A tool is thus provided which can produce a certain surface roughness with a long service life with little or even no adjustment effort.

The reamer section is in particular a geometrically defined reamer section. In particular, the reamer section is preferably arranged on an end face of the reamer, in particular an end face of the main body. The reamer section preferably has, in a manner known per se, a geometrically defined main blade, which is produced in particular as a cutting edge between a rake face and a free face, in particular a rake face and a main free face. It also preferably has a geometrically defined additional blade in a manner known per se, which is produced in particular as a cutting edge between the rake face and an additional free face. The reamer section is set up in particular for the fine machining of a workpiece, in particular for the fine machining of bores. The additional free face is preferably rounded by grinding in some areas. In this case, the additional blade assigned to the additional free face is immediately followed by a circular grinding chamfer as a first additional free face area, which in turn is followed by an area sloping down counter to a machining direction as a second additional free face area. Depending on the nomenclature used, it is also possible for this second additional free face area to be designated as the actual additional free face.

The roughening section is in particular arranged at a finite distance, that is to say different from 0, from the reamer section. In particular, the roughening section is arranged at an axial distance, that is to say a distance measured in the axial direction, from the reamer section. The roughening section thus lags behind the reamer section in the feed direction of the reamer.

The axial direction extends in particular in the feed direction of the reamer relative to a workpiece machined by the reamer. The axial direction preferably corresponds to an axis of symmetry of the reamer. The axial direction preferably corresponds to an axis of rotation of the reamer when the reamer is rotated to machine the workpiece. However, it is also possible that for machining of the workpiece the workpiece is rotated and the reamer is kept stationary or additionally rotated relative to the workpiece. In this case, the axial direction preferably coincides with the axis of rotation of the workpiece. A radial direction is perpendicular to the axial direction. A circumferential direction surrounds the axial direction concentrically.

The roughening blade is preferably designed as a geometrically defined blade. In particular, it is preferably formed as a line of intersection of a roughening rake face with a roughening free face. It is possible that the roughening free face also has a circular grinding chamfer and thus—as explained above in connection with the main and additional blades—is divided into a first roughening free face area and a second roughening free face area. Then—as explained above—the circular grinding chamfer is followed by the area sloping down as a second roughening free face area counter to the machining direction, which preferably corresponds to the direction of rotation of the reamer relative to the workpiece.

In particular, the roughening blade protrudes in the radial direction beyond the reamer section. It is therefore arranged and set up to introduce a certain roughness into a material surface processed by the reamer section, that is to say to remove material from the workpiece surface in addition to the reamer section.

Preferably, the cutting tip—with the reamer section and the roughening section—is designed in one piece, in particular made of the same material. In this way, the geometric relative position between the roughening section and the reamer section is particularly advantageously firmly defined.

According to a further development of the invention, it is provided that the particular projection of the roughening section beyond the reamer section is at least 5 µm to at most 15 µm, preferably from at least 6 µm to at most 12 µm, preferably 8 µm. In particular, in this way, a certain surface roughness can be introduced into the material surface machined by the reamer section, and, in a preferred embodiment, is particularly suitable as a surface roughness for the surface of a small connecting rod eye. In particular, an averaged roughness depth $R_z$ of preferably at least 5 µm to at most 20 µm, preferably from at least 7 µm to at most 12 µm, preferably from at least 8 µm to at most 10 µm, preferably 8 µm, can be generated in the projecting areas defined here.

According to a further development of the invention, it is provided that the reamer section is arranged directly on an end face of the cutting tip, wherein the roughening section is arranged at a distance of at least 3 mm to at most 4 mm, preferably 3.5 mm, from the end face of the cutting tip. These values allow, on the one hand, optimal production of both the reamer section and also the roughening section and, on the other hand, optimized surface treatment. The distance is measured in particular from the end face to a first roughening blade of the roughening section. This is also the distance between the roughening section and the reamer section.

According to a further development of the invention, it is provided that the roughening section has at least one roughening tooth on which the roughening blade is arranged, preferably formed. A roughening of the workpiece surface can be achieved in a particularly efficient manner by means of the roughening tooth. The roughening tooth preferably has the geometry of the roughening blade already described above with the surfaces already explained, namely a roughening rake face, a roughening free face and preferably a circular grinding chamfer.

According to a further development of the invention, it is provided that the roughening section has a plurality of roughening blades, wherein the roughening edges are arranged or offset at a certain roughening distance from one another. In particular, the roughening distance is finite, that is to say, greater than 0. In particular, it is a roughening distance measured in the axial direction. The roughening blades are, in particular, spaced apart from one another in pairs or offset with respect to one another by the specific roughening distance. Thus, they follow one behind the other sequentially in the roughening distance when viewed in the axial direction. In particular, the roughening section has a plurality of roughening teeth, the roughening teeth being arranged or offset with respect to one another at the specific roughening distance. The roughening section preferably has one roughening blade per roughening tooth. Exactly one roughening blade is therefore arranged or formed on each roughening tooth; conversely, each roughening blade is assigned exactly one roughening tooth.

According to a further development of the invention, it is provided that the at least one roughening tooth has a tooth width of at least 0.08 mm to at most 0.2 mm, preferably from at least 0.09 mm to at most 0.15 mm, preferably 0.1 mm. The tooth width is preferably the width measured in the axial direction at the radially most protruding point of the roughening tooth, i.e. in particular the length of the roughening blade measured in the axial direction. In particular with the values for the tooth width determined here, particularly good results can be achieved when roughening a workpiece surface.

According to a further development of the invention, it is provided that the determined roughening distance is at least 0.4 mm to at most 0.8 mm, preferably 0.6 mm. It has been found that particularly good machining results can be achieved in this area of the roughening distance. The roughening distance is preferably defined in particular as the ratio of a predetermined advance of the reamer per revolution relative to the workpiece to the number of roughening teeth of a roughening section. This ensures that surface structures generated by leading roughening teeth are not destroyed by trailing roughening teeth. In particular, the roughening then takes place in the form of a helical line or roughening helix introduced into the tool, preferably with a pitch of 0.4 to 0.8 mm per revolution, preferably 0.6 mm per revolution (mm/rev).

According to a further development of the invention, it is provided that the roughening teeth of the roughening section, in particular all roughening teeth of the roughening section, have the same, in particular identical, geometry. This has proven to be particularly advantageous for machining the workpiece surface.

According to a further development of the invention, it is provided that the at least one cutting tip is rigidly, preferably undetachably, fastened to the main body. In this context, an undetachable fastening is understood to mean a fastening to the main body which cannot be released without the improper use of force, in particular not in a non-destructive manner. In this way, the cutting tip can be arranged on the main body with a particularly high degree of accuracy. The cutting tip is particularly preferably soldered, in particular brazed, to the main body. In particular, the cutting tip is preferably soldered into a groove provided for this purpose in the main body.

According to a further development of the invention it is provided that a plurality of cutting tips is arranged on the main body. The reamer is therefore designed in particular as a multi-bladed reamer, so that a bore can be machined very efficiently and also quickly. The reamer also has a particularly long service life. The cutting tips are in particular offset with respect to one another in the circumferential direction, preferably with an unequal angular spacing, on the main body. The cutting tips are preferably all arranged at the same axial height on the main body, in particular with their end faces preferably aligned with one another. In particular, each cutting tip of the plurality of cutting tips has in each case a reamer section and an associated roughening section arranged at a distance from the reamer section.

According to a further development of the invention, it is provided that the different cutting tips differ—in particular in pairs—in the distance between the relevant roughening section and the relevant reamer section, in particular in the distance between the relevant roughening section and the end face of the cutting tip. In particular, all cutting tips are preferably designed differently with regard to this distance. Otherwise, they preferably have the same, in particular identical, geometries of the reamer section and the roughening section. In particular, there is preferably a first cutting tip with the smallest distance between the roughening section and the reamer section, starting from which in the circumferential direction—in particular counter to the machining direction—the distance from cutting tip to cutting tip increases, preferably linearly. In particular, this ensures that a defined roughening of the surface, in particular in the form of a helical roughening, is obtained, preferably with a pitch of 0.4 to 0.8 mm/rev, preferably 0.6 mm/rev.

In a preferred embodiment, the reamer has six cutting tips.

According to a further development of the invention, it is provided that an interface is arranged or formed on the main body, and is set up for fastening the reamer, in particular the main body, to a machine spindle. The interface can in particular be set up to clamp the reamer in the machine spindle, in particular it can be designed as a conical interface, preferably as a precision interface, or as a clamping cylinder.

According to a further development of the invention it is provided that the at least one cutting tip includes cermet or hard metal, and preferably consists of cermet or hard metal. Preferably, all cutting tips of the reamer include cermet and hard metal or consist of cermet or hard metal.

It is possible for the cutting tip to have a coating, in particular in the area of the reamer section and/or in the area of the roughening section.

The invention is explained in greater detail below with reference to the drawing. In the drawing.

Figure 1:
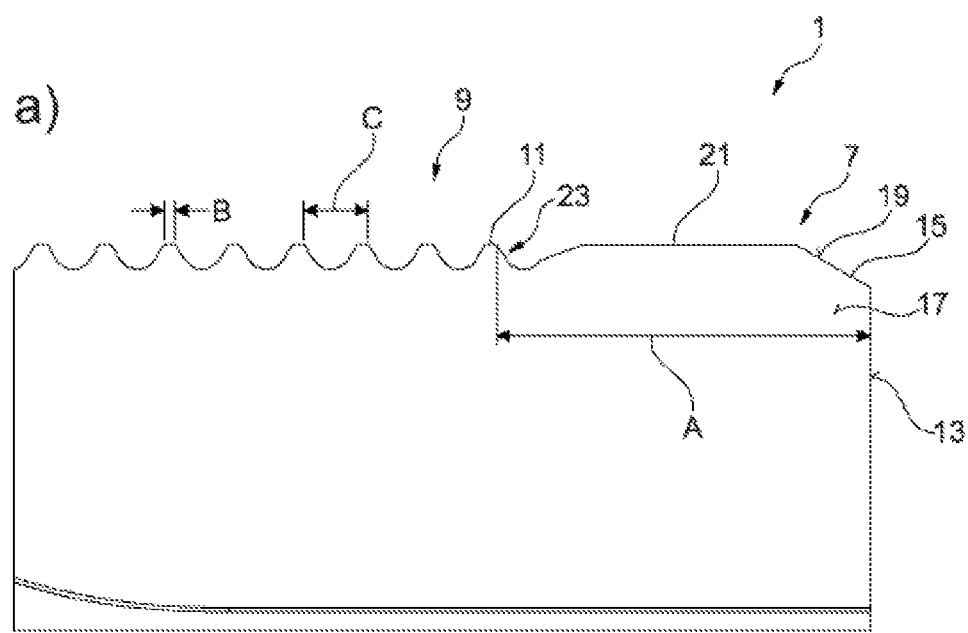
FIG. 1 is a representation of an embodiment of a cutting tip for a reamer in a top view.
Figure 1:
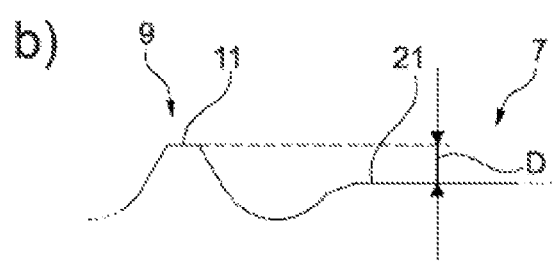
Figure 3:
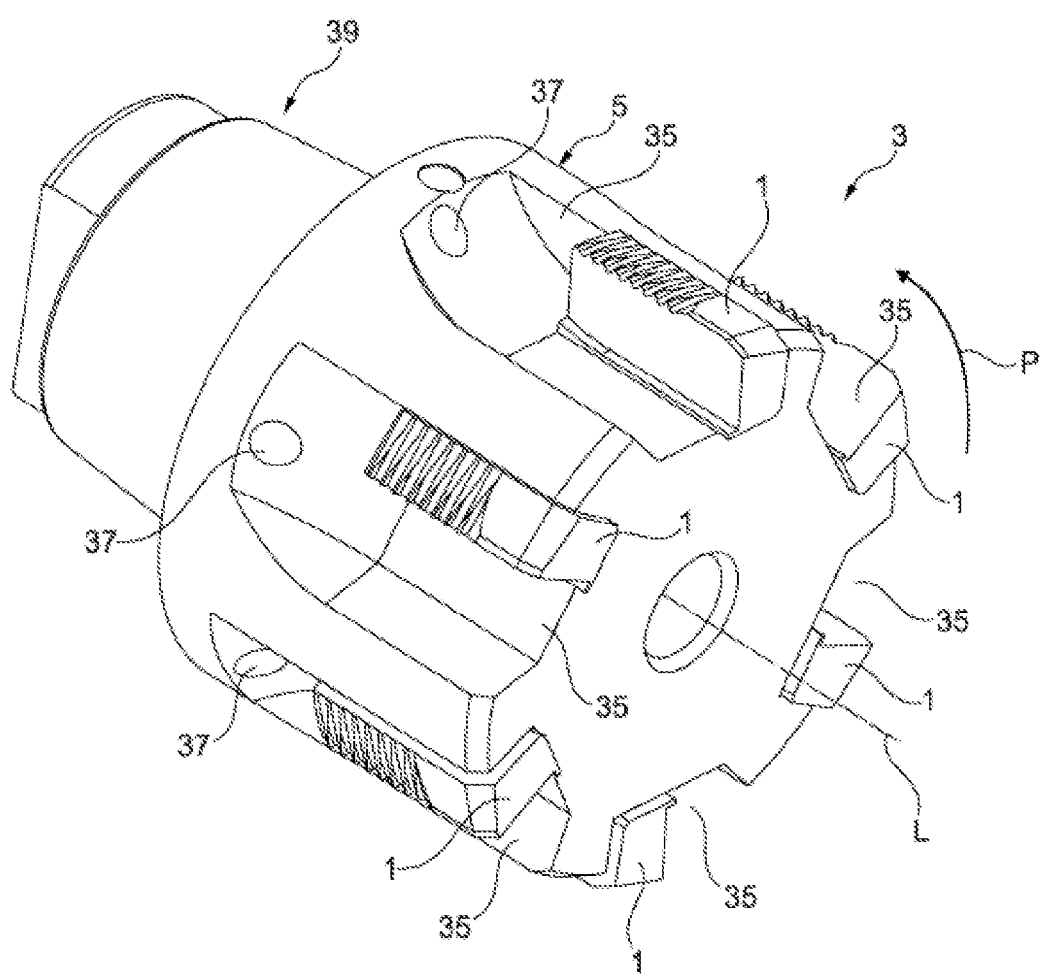
FIG. 3 is a representation of an embodiment of a reamer with the cutting tip according to FIG. 1.

FIG. 1 shows, in a), a representation in a top view of an embodiment of a cutting tip 1 for an embodiment of a reamer 3 shown in FIG. 3. With reference to FIG. 3, the reamer 3 has a main body 5 on which the cutting tip 1 is arranged. With reference to FIG. 1, the cutting tip 1 has a reamer section 7 and, at a distance A from the reamer section 7, a roughening section 9 with at least one roughening blade 11. In b) it can be seen, on the basis of an exaggerated representation that is not to scale, that the roughening section 9, in particular the roughening blade 11, protrudes beyond the reamer section 7 by a particular projection D.

The reamer section 7 is in particular a geometrically defined reamer section. In particular, it has, on one end face 13, a geometrically defined main blade 15, which is formed as the cutting edge of a rake face 17 with a free face 19 in a manner that is conventional per se. The reamer section 7 also has an additional blade 21, which is designed in an analogous manner as a geometrically defined blade and, starting from the end face 13, adjoins the main blade 15.

The roughening section 9 is arranged at an axial distance A from the reamer section 7, measured in the horizontal direction in FIG. 1, and in particular it lags behind the reamer section 7 when viewed in the feed direction of the reamer 3.

The roughening blade 11 is also designed as a geometrically defined blade and, in particular, is likewise formed as a cutting edge of the rake face 17 with a roughening free face not specifically designated here.

In particular, the roughening blade 11 projects in the radial direction, that is to say in the vertical direction in FIG. 1, by the particular projection D beyond the additional blade 21.

The roughening section 9 and the reamer section 7 here are formed in one piece on the cutting tip 1.

The particular projection D is preferably from at least 5 μm to at most 15 μm, preferably from at least 6 μm to at most 12 μm, preferably 8 μm.

The reamer section 7 is in particular arranged directly on the end face 13, that is to say directly adjoining the end face 13, and the roughening section 9—as shown in a)—is arranged at the distance A from the end face 13, wherein the distance A measured in the axial direction, i.e. in the horizontal direction in FIG. 1, is preferably from at least 3 mm to at most 4 mm, preferably 3.5 mm. In particular, the distance A is measured from the end face 13 to the beginning of a first—fully formed—roughening blade 11 of the reamer section 9.

The roughening section 9 has at least one roughening tooth 23, in this case a plurality of roughening teeth 23, only one of which is designated by the reference sign 23 for the sake of better clarity, the roughening blade 11 being formed on the roughening tooth 23. In particular, a roughening blade 11 is formed on each roughening tooth 23. In particular, the roughening section 9 thus has a plurality of roughening blades 11, wherein the roughening blades 11 and also the roughening teeth 23 are arranged at a certain roughening distance C from one another, in particular offset from one another in pairs in the axial direction by the roughening distance C. The roughening distance C is also measured in the axial direction, i.e. in the horizontal direction in FIG. 1, in each case from a point on a first roughening tooth 23 to an analogous point on a second, directly following roughening tooth 23.

The roughening distance C is preferably from at least 0.4 mm to at most 0.8 mm, preferably 0.6 mm.

The roughening teeth 23 each have a—preferably identical—tooth width B, which is preferably from at least 0.08 mm to at most 0.2 mm, preferably from at least 0.09 to at most 0.15 mm, preferably 0.1 mm.

Figure 2:
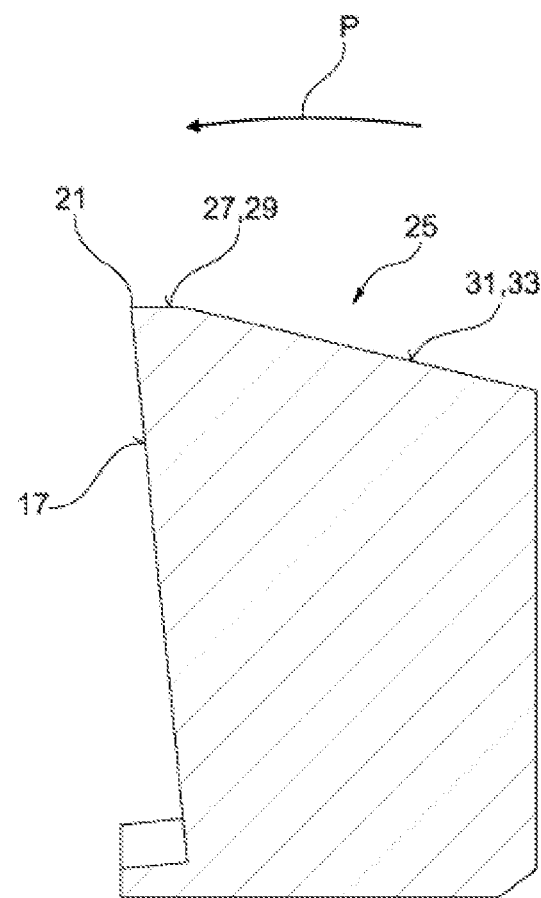
FIG. 2 is a representation of the cutting tip according to FIG. 1 in cross section.

FIG. 2 shows a cross-sectional view of the cutting tip 1 according to FIG. 1, the cross section being arranged at the axial height of the additional blade 21. It becomes clear here that the additional blade 21 is formed as the cutting edge of the rake face 17 with an additional free face 25. The additional free face 25 here has two additional free face areas, namely a circular grinding chamfer 27 directly adjoining the additional blade 21 as a first additional free face area 29, and an area 31 sloping down counter to a machining direction as a second additional free face area 33 adjoining the circular grinding chamfer 27. The machining direction is shown by an arrow P in FIG. 2. The circular grinding chamfer 27 is used in a manner known per se to support and guide the reamer 3 in a machined bore. The geometry explained here in connection with the additional blade 21 is preferably also provided in an analogous manner on the at least one roughening blade 11, preferably on each roughening blade 11 of the plurality of roughening blades 11. These blades also each have a free face which is divided into two free face areas, one of which is designed as a circular grinding chamfer and the other as a sloping area.

All of the roughening teeth 23 of the roughening section 9 preferably have the same, in particular identical, geometry.

FIG. 3 shows a representation of the reamer 3 with the cutting tip 1 fastened to the main body 5, as already explained above. In particular, the cutting tip 1 is rigidly, in particular undetachably, attached to the main body 5, preferably soldered into the main body 5. For this purpose, a groove 35, into which the cutting tip 1 is soldered, is preferably introduced into the main body 5. The cutting tip 1 is particularly preferably brazed to the main body 5 or brazed into the main body 5.

The reamer 3 has a plurality of cutting tips 1, in this case six cutting tips 1, which, when viewed in the circumferential direction of the reamer 1, are arranged offset from one another at the same axial height on the main body 5. In particular, the end faces 13 of the cutting tips 1 are aligned with one another. The cutting tips 1 are preferably arranged at an unequal angular spacing along the circumference of the main body 5. The cutting tips 1 preferably differ—in particular in pairs—in the specific distance A by which the roughening section 9 is spaced from the relevant end face 13 of the relevant cutting tip 1. Moreover, the cutting tips 1 are preferably the same, in particular designed identically. In particular, the cutting tips 1 preferably also have the same geometry of the roughening section 9 and preferably also of the reamer section 7.

The axial direction of the reamer 3 extends along a central longitudinal axis L. At the same time this corresponds to the axial direction of the cutting tips 1. The radial direction is perpendicular to the axial direction and thus to the central longitudinal axis L, and the circumferential direction encompasses the central longitudinal axis L concentrically.

Each cutting tip 1 is preferably assigned a groove 35 on the main body 5 in which the cutting tip 1 is arranged. The grooves 35 preferably also form rake spaces for the cutting tips 1.

In FIG. 3, coolant/lubricant openings 37 are also shown, wherein a coolant/lubricant opening 37 opens into a groove 35, and wherein coolant/lubricant can be introduced into the grooves 35 via the coolant/lubricant openings 37.

An interface 39 for fastening to a machine spindle is also arranged or formed on the main body 5. The interface 39 is designed here as a conical interface, in particular as a precision interface.

Figure 4:
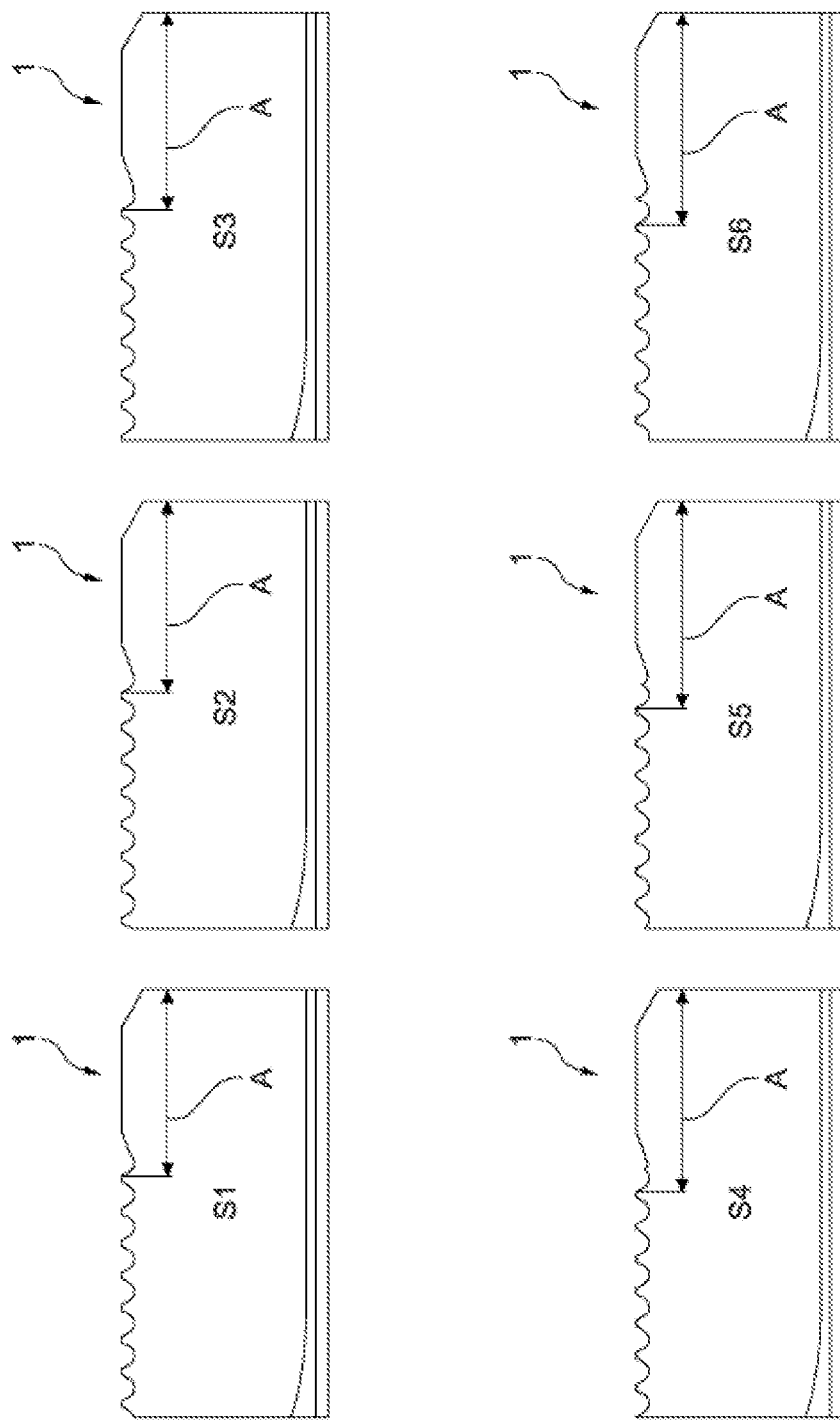
FIG. 4 is an illustration of a plurality of cutting tips for the reamer according to FIG. 3.

FIG. 4 shows a representation of the six cutting tips 1 of the reamer 3 according to FIG. 3. The various measuring plates are designated by S1, S2, S3, S4, S5 and S6 in the order in which they are arranged on the main body 5 contrary to the machining direction indicated by the arrow P in FIG. 3, which is preferably the direction of rotation of the reamer 3. In this order they follow one another counter to the machining direction or rotation direction of the reamer 3. Starting from the first cutting tip S1, the distance A increases, preferably linearly, from cutting tip to cutting tip counter to the machining direction P.

The cutting tips 1 are preferably made of cermet or hard metal. It is possible for the cutting tips 1 to be coated at least in the area of one blade selected from the main blade 15, the additional blade 21, and the at least one roughening blade 11.

The invention claimed is:

1. A reamer (3), having
    a main body (5) and
    at least one cutting tip (1) arranged on the main body (5), the cutting tip (1) having a reamer section (7),
    the cutting tip (1) having, at a distance (A) from the reamer section (7), a roughening section (9) having at least one roughening blade (11), the at least one roughening blade (11) protruding beyond the reamer section (7) by a particular projection (D), wherein a plurality of cutting tips (1) are arranged on the main body (5), and at least a portion of the plurality of cutting tips (1) differ in the distance (A) at which the roughening section (9) is offset from the reamer section (7).

2. The reamer (3) according to claim 1, characterized in that the particular projection (D) is from at least 5 µm to at most 15 µm.

3. The reamer (3) according to claim 1, characterized in that the reamer section (7) is arranged directly on an end face (13) of the cutting tip (1), wherein the roughening section (9) is arranged at the distance (A) of at least 3 mm to at most 4 mm, from the end face (13).

4. The reamer (3) according to claim 1, characterized in that the roughening section (9) has at least one roughening tooth (23) on which the roughening blade (11) is arranged.

5. The reamer (1) according to claim 4, characterized in that the at least one roughening tooth (23) has a tooth width (B) of at least 0.08 mm to at most 0.2 mm.

6. The reamer (3) according to claim 1, characterized in that the roughening section (9) has a plurality of roughening blades (11), wherein the roughening blades (11) are arranged at a determined roughening distance (C) from one another.

7. The reamer (3) according to claim 6, characterized in that the determined roughening distance (C) is at least 0.4 mm to at most 0.8 mm.

8. The reamer (3) according to claim 1, characterized in that the roughening section (9) has a plurality of roughening teeth (23), wherein the roughening teeth (23) of the roughening section (9) have the same geometry.

9. The reamer (3) according to claim 1, characterized in that the at least one cutting tip (1) is rigidly attached to the main body (5).

10. The reamer (3) according to claim 1, characterized in that the at least one cutting tip (1) is soldered into the main body (5).

11. The reamer (3) according to claim 1, characterized in that an interface (39) for fastening to a machine spindle is arranged on the main body (5).

12. The reamer (3) according to claim 1, characterized in that the cutting tip (1) includes cermet or hard metal.

* * * * *